US012664055B2

(12) United States Patent
Jo et al.

(10) Patent No.: US 12,664,055 B2
(45) Date of Patent: Jun. 23, 2026

(54) NETWORK SYSTEM FOR RUNNING DISTRIBUTED ENVIRONMENT APPLICATIONS AND FAULT TOLERANCE METHOD USING THE SAME

(71) Applicant: MOREH CORP., Seoul (KR)

(72) Inventors: Gangwon Jo, Seoul (KR); Jungho Park, Seoul (KR)

(73) Assignee: MOREH CORP., Seoul (KR)

( * ) Notice: Subject to any disclaimer, the term of this patent is extended or adjusted under 35 U.S.C. 154(b) by 7 days.

(21) Appl. No.: 18/592,839

(22) Filed: Mar. 1, 2024

(65) Prior Publication Data

US 2024/0303164 A1    Sep. 12, 2024

(30) Foreign Application Priority Data

Mar. 6, 2023    (KR) ........................ 10-2023-0029483
Oct. 24, 2023    (KR) ........................ 10-2023-0142890

(51) Int. Cl.
G06F 11/1446        (2026.01)

(52) U.S. Cl.
CPC ...... G06F 11/1461 (2013.01); G06F 11/1469 (2013.01)

(58) Field of Classification Search
CPC ............. G06F 11/1461; G06F 11/1469; G06F 11/203; G06F 11/2048; G06F 11/2041; H04L 41/12; H04L 41/0663; H04L 41/0893; H04L 67/10
USPC .......................................................... 714/15
See application file for complete search history.

(56) References Cited

U.S. PATENT DOCUMENTS

| | | | |
|---|---|---|---|
| 11,734,919 B1 * | 8/2023 | Cazzari .................. | G06V 10/82 |
| | | | 382/103 |
| 2004/0153866 A1 * | 8/2004 | Guimbellot ............... | H04L 1/22 |
| | | | 714/4.11 |
| 2008/0201602 A1 * | 8/2008 | Agarwal ............. | G06F 11/2097 |
| | | | 714/4.1 |
| 2010/0122112 A1 | 5/2010 | Yoo | |

FOREIGN PATENT DOCUMENTS

| | | |
|---|---|---|
| KR | 100806487 B1 | 2/2008 |
| KR | 10-2014-0053265 A | 5/2014 |
| KR | 10-2015-0124642 A | 11/2015 |
| WO | 2013/017979 A1 | 2/2013 |

* cited by examiner

*Primary Examiner* — Yair Leibovich
(74) *Attorney, Agent, or Firm* — Banner & Witcoff, Ltd.

(57)        ABSTRACT

A network system for running distributed environment applications is provided, including a main network part for interface between devices belonging to a plurality of device groups, and a sub-network part for interface between devices belonging to sub-device group, in which the sub-device group includes at least some of the devices belonging to each of different device groups.

18 Claims, 7 Drawing Sheets

700

S710
RECEIVE APPLICATION EXECUTION COMMAND

S720
IDENTIFY FAILURE OCCURRENCE INFORMATION ASSOCIATED WITH FIRST DEVICE BELONGING TO SPECIFIC DEVICE GROUP OF PLURALITY OF DEVICE GROUPS

S730
TERMINATE FIRST SUB-PROCESS ASSOCIATED WITH FIRST DEVICE

S740
EXECUTE SECOND SUB-PROCESS ASSOCIATED WITH SECOND DEVICE, WHICH IS IDLE DEVICE BELONGING TO STANDBY DEVICE GROUP

700

S710

RECEIVE APPLICATION EXECUTION COMMAND

S720

IDENTIFY FAILURE OCCURRENCE INFORMATION ASSOCIATED WITH FIRST DEVICE
BELONGING TO SPECIFIC DEVICE GROUP OF PLURALITY OF DEVICE GROUPS

S730

TERMINATE FIRST SUB-PROCESS ASSOCIATED WITH FIRST DEVICE

S740

EXECUTE SECOND SUB-PROCESS ASSOCIATED WITH SECOND DEVICE,
WHICH IS IDLE DEVICE BELONGING TO STANDBY DEVICE GROUP

NETWORK SYSTEM FOR RUNNING DISTRIBUTED ENVIRONMENT APPLICATIONS AND FAULT TOLERANCE METHOD USING THE SAME

CROSS-REFERENCE TO RELATED APPLICATIONS

This application claims priority under 35 U.S.C § 119 to Korean Patent Application No. 10-2023-0029483, filed in the Korean Intellectual Property Office on Mar. 6, 2023, and No. 10-2023-0142890, filed in the Korean Intellectual Property Office on Oct. 24, 2023, the entire contents of which are hereby incorporated by reference.

TECHNICAL FIELD

The disclosure relates to a network system for running distributed environment applications and a fault tolerance method using the same, and specifically, to a network system including a main network part for interface between devices belonging to a plurality of device groups, and a sub-network part for interface between devices belonging to a sub-device group, and a fault tolerance method using the same.

BACKGROUND

Technology of processing data in parallel in a distributed environment using multiple devices is essential for training deep learning models. Generally, deep learning model training involves a process in which each node calculates the error between the training data and the prediction of the labeled output, and changes generated based on the calculated error are passed to other nodes, thereby updating the model. Therefore, the interface speed between nodes may be an important factor in efficiently training deep learning models.

Meanwhile, if a hardware error occurs in a device (e.g. GPU) in a distributed environment, the problem can be resolved by replacing the failing device with another device and restarting the application using regularly stored checkpoints. However, this method has the problem that service interruption cannot be avoided because the user must perform the process of resetting the device.

In the distributed environment, because each device is interfaced through the network, an improved network system is required, which can improve data processing speed in the distributed environment and also allow work to be performed smoothly through other devices even if a problem occurs in a certain device among the devices in the distributed environment.

SUMMARY

In order to solve one or more problems (e.g., the problems described above and/or other problems not explicitly described herein), the present disclosure provides a network system for running distributed environment applications, a fault tolerance method using the same, a non-transitory computer-readable recording medium for storing instructions, and an apparatus (system).

The present disclosure may be implemented in various ways, including a method, an apparatus (system), or a non-transitory readable storage medium storing instructions.

A network system for running distributed environment applications may include a main network part for interface between devices belonging to a plurality of device groups, and a sub-network part for interface between devices belonging to sub-device group, in which the sub-device group may include at least some of the devices belonging to each of different device groups.

The main network part may include a plurality of first type of network equipment connected to the devices belonging to each of the plurality of device groups, and a second type of network equipment connected to the plurality of first type of network equipment.

The sub-network part may include a third type of network equipment connected to the devices belonging to the sub-device group.

The plurality of device groups may include a standby device group including devices in an idle state.

If a certain device in an active state belonging to the plurality of device groups fails while running the distributed environment application, the device in the idle state belonging to the standby device group may be set to be switched to an active state and may be set to perform a task corresponding to a task associated with the certain device.

The failing certain device may be set to be registered in the standby device group as a device in an idle state, in response to being determined to be in a normal state after failure repair.

A fault-tolerance method using the network system may be provided, which may include receiving an application execute command, identifying failure occurrence information associated with a first device belonging to a certain device group of the plurality of device groups, terminating a first sub-process associated with the first device, and executing a second sub-process associated with a second device which is a device in an idle state belonging to the standby device group, in which the first device and the second device may be devices belonging to the same sub-network part.

The executing the second sub-process may include identifying a latest checkpoint associated with the first device, identifying an operation graph required for failure recovery associated with the first device, and executing the second sub-process associated with the second device using the latest checkpoint and the operation graph required for failure recovery, and the operation graph required for failure recovery may include an operation graph from a time point associated with the latest checkpoint to a time point at which the failure occurs.

The executing the second sub-process associated with the second device using the latest checkpoint and the operation graph required for failure recovery may include allocating the latest checkpoint and the operation graph required for failure recovery to the second sub-process, restoring data associated with the first device using the latest checkpoint, and executing an operation associated with the operation graph necessary for failure recovery.

A non-transitory computer-readable recording medium storing instructions for executing on a computer a fault tolerance method is provided.

According to some examples of the present disclosure, devices included in the network system can not only interface with the devices connected to the network switch in the main network part through the main network part, but also interface with the devices connected to the same network switch in the sub-network part through the sub-network part, so the effect of expanding the network bandwidth can be expected.

According to some examples of the present disclosure, even if a certain device executing operation fails while the application is running, the process associated with the device in an idle state is automatically created, and using this, the work performed in the process of the failing device is automatically switched and the failure can be restored without requiring separate user intervention, thereby improving the availability and reliability of the system.

The effects of the present disclosure are not limited to the effects described above, and other effects not described herein can be clearly understood by those of ordinary skill in the art (referred to as "ordinary technician") from the description of the claims.

BRIEF DESCRIPTION OF THE DRAWINGS

The above and other objects, features and advantages of the present disclosure will be described with reference to the accompanying drawings described below, where similar reference numerals indicate similar elements, but not limited thereto, in which.

DETAILED DESCRIPTION

Figure 1:
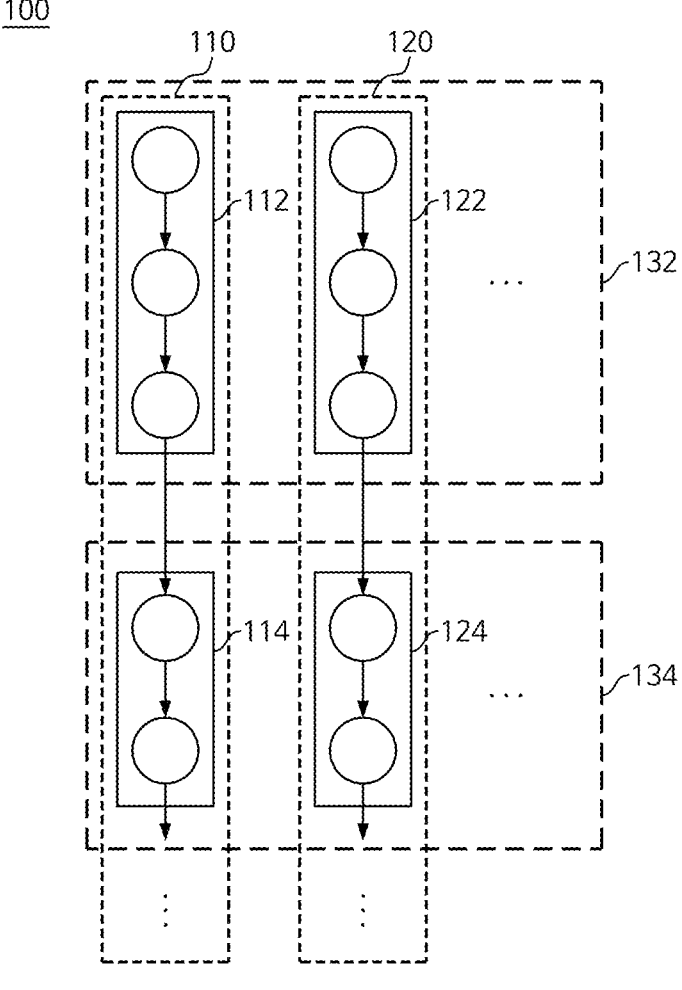
FIG. 1 is a diagram illustrating a general example of a network system for running distributed environment applications.

Hereinafter, example details for the practice of the present disclosure will be described in detail with reference to the accompanying drawings. However, in the following description, detailed descriptions of well-known functions or configurations will be omitted if it may make the subject matter of the present disclosure rather unclear.

In the accompanying drawings, the same or corresponding components are assigned the same reference numerals. In addition, in the following description of various examples, duplicate descriptions of the same or corresponding components may be omitted. However, even if descriptions of components are omitted, it is not intended that such components are not included in any example.

Advantages and features of the disclosed examples and methods of accomplishing the same will be apparent by referring to examples described below in connection with the accompanying drawings. However, the present disclosure is not limited to the examples disclosed below, and may be implemented in various forms different from each other, and the examples are merely provided to make the present disclosure complete, and to fully disclose the scope of the disclosure to those skilled in the art to which the present disclosure pertains.

The terms used herein will be briefly described prior to describing the disclosed example(s) in detail. The terms used herein have been selected as general terms which are widely used at present in consideration of the functions of the present disclosure, and this may be altered according to the intent of an operator skilled in the art, related practice, or introduction of new technology. In addition, in specific cases, certain terms may be arbitrarily selected by the applicant, and the meaning of the terms will be described in detail in a corresponding description of the example(s). Therefore, the terms used in the present disclosure should be defined based on the meaning of the terms and the overall content of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it is intended as meaning that the portion may additionally comprise (or include or have) another component, rather than excluding the same, unless specified to the contrary.

Further, the term "part", "module" or "unit" used herein refers to a software or hardware component, and "part", "module" or "unit" performs certain roles. However, the meaning of the "part", "module" or "unit" is not limited to software or hardware. The "part", "module" or "unit" may be configured to be in an addressable storage medium or configured to play one or more processors. Accordingly, as an example, the "part", "module" or "unit" may include components such as software components, object-oriented software components, class components, and task components, and at least one of processes, functions, attributes, procedures, subroutines, program code segments, drivers, firmware, micro-codes, circuits, data, database, data structures, tables, arrays, and variables. Furthermore, functions provided in the components and the "parts", "modules" or "units" may be combined into a smaller number of components and "parts", "modules" or "units", or further divided into additional components and "parts", "modules" or "units."

The "part", "module" or "unit" may be implemented as a processor and a memory. A "processor" should be broadly interpreted to include general-purpose processors, central processing units (CPUs), microprocessors, digital signal processors (DSPs), controllers, microcontrollers, state machines, accelerators, etc. Under some circumstances, the "processor" may refer to an application-specific integrated circuit (ASIC), a programmable logic device (PLD), a field-programmable gate array (FPGA), and so on. The "processor" may refer to a combination of processing devices, e.g., a combination of a DSP and a microprocessor, a combination of a plurality of microprocessors, a combination of one or more microprocessors in combination with a DSP core, a combination of any accelerators, or a combination of any other such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, and so on. The memory is said to be in electronic communication with a processor if the processor can read information from and/or write information to the memory. The memory integrated with the processor is in electronic communication with the processor.

In the present disclosure, a "system" may refer to at least one of a server apparatus and a cloud apparatus, but aspects are not limited thereto. For example, the system may include one or more server apparatus. In another example, the system may include one or more cloud apparatus. In still another example, the system may include both the server apparatus and the cloud apparatus operated in conjunction with each other.

In the present disclosure, "each of a plurality of A" may refer to each of all components included in the plurality of A, or may refer to each of some of the components included in a plurality of A.

In the present disclosure, "application" or "program" may refer to a program that performs processing including operations, etc. associated with a machine learning model and/or an artificial neural network model. For example, the application or program may refer to a program associated with deep learning operation.

In the examples of the present disclosure, "artificial intelligence operation" may refer to any operation associated with a machine learning model (e.g., an artificial neural network model, etc.). For example, an artificial intelligence operation may be an operation performed in each layer included in an artificial neural network model. For example, the artificial intelligence operation may include an addition operation, a subtraction operation, a maximum value calculation operation, a minimum value calculation operation, a floating point multiplication operation, weighting operation, convolution operation, matrix multiplication operation, batch normalization operation, Recitified Linear Unit (ReLU) operation, pooling operation, Long Short-Term Memory (LSTM) operation, Gated Recurrent Unit (GRU) operation, etc. performed in a layer included in an artificial neural network model, but is not limited thereto.

In the present disclosure, an "operation graph" may refer to a graph that is generated to efficiently execute a program and has the same meaning as a program and/or information associated therewith. For example, the operation graph is an intermediate representation generated after operation processing of input data and may include information on the input and output data, operation order, etc. for artificial intelligence operation. The operation graph may be represented by one or more nodes and one or more edges.

In the present disclosure, a "device" may refer to a processor that performs a computing task or an apparatus including such a processor. For example, the "device" may refer to a Central Processing Unit (CPU) responsible for executing programs and general operations, any processing unit including the CPU, or any apparatus including the CPU. Additionally or alternatively, the "device" may refer to an accelerator which is hardware designed to accelerate a specific task, or any processing unit including the accelerator, or any apparatus including the accelerator. For example, an "accelerator" may include, but is not limited to, a Graphics Processing Unit (GPU), a Neural Processing Unit (NPU), a Tensor Processing Unit (TPU), etc. The "device" may refer to any device including one or more processors and/or one or more accelerators. For example, the "device" may refer to a server apparatus that includes one or more processors (e.g., CPU) and one or more accelerators (e.g., GPU).

In the present disclosure, the "process" may mean an instance of an application or program running on a computer. The process may be managed by the operating system and include a set of codes allocated to a memory, data, and execution state, etc. Separate software may be provided for control and management of the process through the device.

In the present disclosure, "fault tolerance" may refer to an ability of a system to operate smoothly and perform functions without interruption even if a fault occurs due to internal or external factors. For example, a "fault tolerance method" may refer to a method and/or procedure of a system for operating smoothly and performing functions without interruption even if a fault occurs due to internal or external factors.

In the present disclosure, "checkpoint" relates to a function of storing the execution state of a program and data associated therewith and later resuming execution from that state, and the checkpoint may refer to storing the execution state of the program or system and the data associated therewith.

FIG. 1 is a diagram illustrating a general example of a network system 100 for running distributed environment applications. The network system 100 may be configured to distribute tasks for running the applications through a plurality of device groups 110 and 120 and process the distributed tasks in parallel. FIG. 1 illustrates an example provided to explain how the tasks for running applications are distributed and the distributed tasks are processed in parallel, using each of devices 112, 114, 122, and 124 belonging to the plurality of device groups 110 and 120.

Each of the devices 112, 114, 122, and 124 may refer to a server apparatus including one or more processors (e.g., CPUs) and one or more accelerators (e.g., GPUs). Nodes in each of the devices 112, 114, 122, and 124 may conceptually represent a task associated with the device. In addition, edges connecting each of the nodes may conceptually represent a task sequence.

The network system 100 may be a distributed environment network for performing deep learning training. For example, the network system 100 may distribute deep learning training tasks through the plurality of device groups 110 and 120 and process the distributed tasks in parallel. To this end, the plurality of device groups 110 and 120 may be allocated a plurality of pieces of training data and perform unit training based on the allocated plurality of pieces of training data.

For example, the first device 112 of the first device group 110 and the second device 122 of the second device group 120 may be configured to perform first unit training using different training data. In addition, the third device 114 of the first device group 110 and the fourth device 124 of the second device group 120 may be configured to perform second unit training using different training data. In this case, the devices belonging to each device group 110 and 120 may interact through the main network part.

The weights of the deep learning model acquired based on the unit training results may be transmitted to the devices in each device group that perform the same unit training through the sub-network part and be updated. The sub-network part may be a network unit for interface between the devices included in sub-network groups 132 and 134. Each of the sub-network groups 132 and 134 may include some of the devices included in different device groups.

Through this, devices in the same device group may interface through the main network part, and devices in different device groups may interface through the sub-network part, so that the effect of expanding the network bandwidth can be expected.

Figure 2:
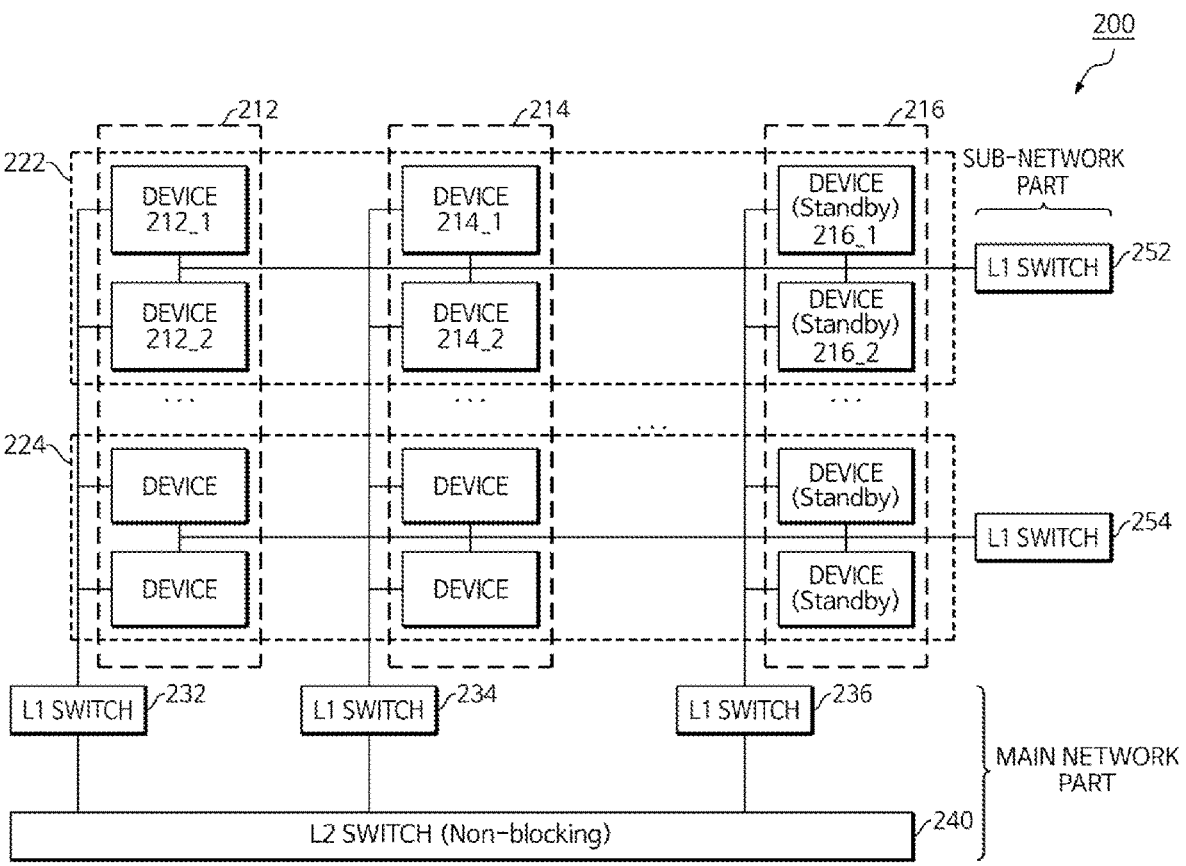
FIG. 2 is a diagram illustrating a specific example of a network system for running distributed environment applications.

FIG. 2 is a diagram illustrating a specific example of a network system 200 for running distributed environment applications. The network system 200 for running distributed environment applications may include a main network part 552 and a sub-network part 554.

The main network part is a network unit for interface between devices belonging to a plurality of device groups 212, 214, and 216, and each device group 212, 214, and 216 may be connected to first type of network equipment 232, 234, and 236. The first type of network equipment may be a leaf network switch. For example, a device belonging to the first device group 212 may be connected to the first network switch 232. A device belonging to the second device group 214 may be connected to the second network switch 234. In addition, a device belonging to the third device group 216 may be connected to the third network switch 236.

Each device belonging to each device group 212, 214, and 216 may refer to a server apparatus including one or more processors (e.g., CPUs) and one or more accelerators (e.g., GPUs). FIG. 2 illustrates a configuration in which each device is connected to network equipment using one channel, but this is for convenience of explanation, and the number of channels between each device and network equipment is not limited thereto. For example, one device may include a plurality of accelerators and may be connected to a network equipment through a single or a plurality of communication modules (e.g., Network Interface Card (NIC)).

In addition, the first type of network equipment 232, 234, and 236 of the main network part may be connected to a second type of network equipment 240. The second type of network equipment may be a spine network switch. In this case, the second type of network equipment may be a non-blocking switch. For example, the first network switch 232, the second network switch 234, and the third network switch 236, which are the first type of network equipment, may be connected to the spine network switch 240, which is the second type of network equipment. Through this, devices belonging to each device group 212, 214, and 216 may be connected to communicate with each other through the first type of network equipment 232, 234, and 236 and the second type of network equipment 240.

The sub-network part is a network unit for interface between devices belonging to sub-device groups 222 and 224, and the sub-network part may include at least some of the devices belonging to each of different device groups. For example, as illustrated in FIG. 1, a first device 212_1 and a second device 212_2 belonging to the first device group 212, a third device 214_1 and a fourth device 214_2 belonging to the second device group 214, and a fifth device 216_1 and a sixth device 216_2 belonging to the third device group 216 may belong to the first sub-device group 222 and may be configured as a sub-network part. The second sub-device group 224 may also be configured as a sub-network part as described above.

Devices belonging to the sub-device groups 222 and 224 may be connected to a third type of network equipment. The third type of network equipment may be a leaf network switch. As illustrated, the fourth network switch 252 connected to the device belonging to the first sub-device group 222 may be connected to some of the devices included in each of the first device group 212, the second device group 214, and the third device group 216. For example, the fourth network switch 252 may be connected to some of the devices 212_1 and 212_2 belonging to the first device group 212, some of the devices 214_1, and 214_2 belonging to the second device group 214, and some of the devices 216_1 and 216_2 belonging to the third device group 216. A fifth network switch 254 connected to devices belonging to the second sub-device group 224 may also be configured in the similar manner as described above.

The plurality of device groups 212, 214, and 216 may include the standby device group 216 including devices in an idle state. If a certain device in an active state belonging to the plurality of device groups fails while running the distributed environment applications, a device in an idle state belonging to the standby device group 216 may be set to be switched to an active state and perform a task corresponding to the task associated with the certain device. For example, as illustrated, a device belonging to the third device group 216 may be set to be in an idle state, and if a failure occurs in a certain device of the first device group 212 and/or the second device group 214, the device may be switched to an active state and perform a task corresponding to the task associated with the failing certain device.

Figure 3:
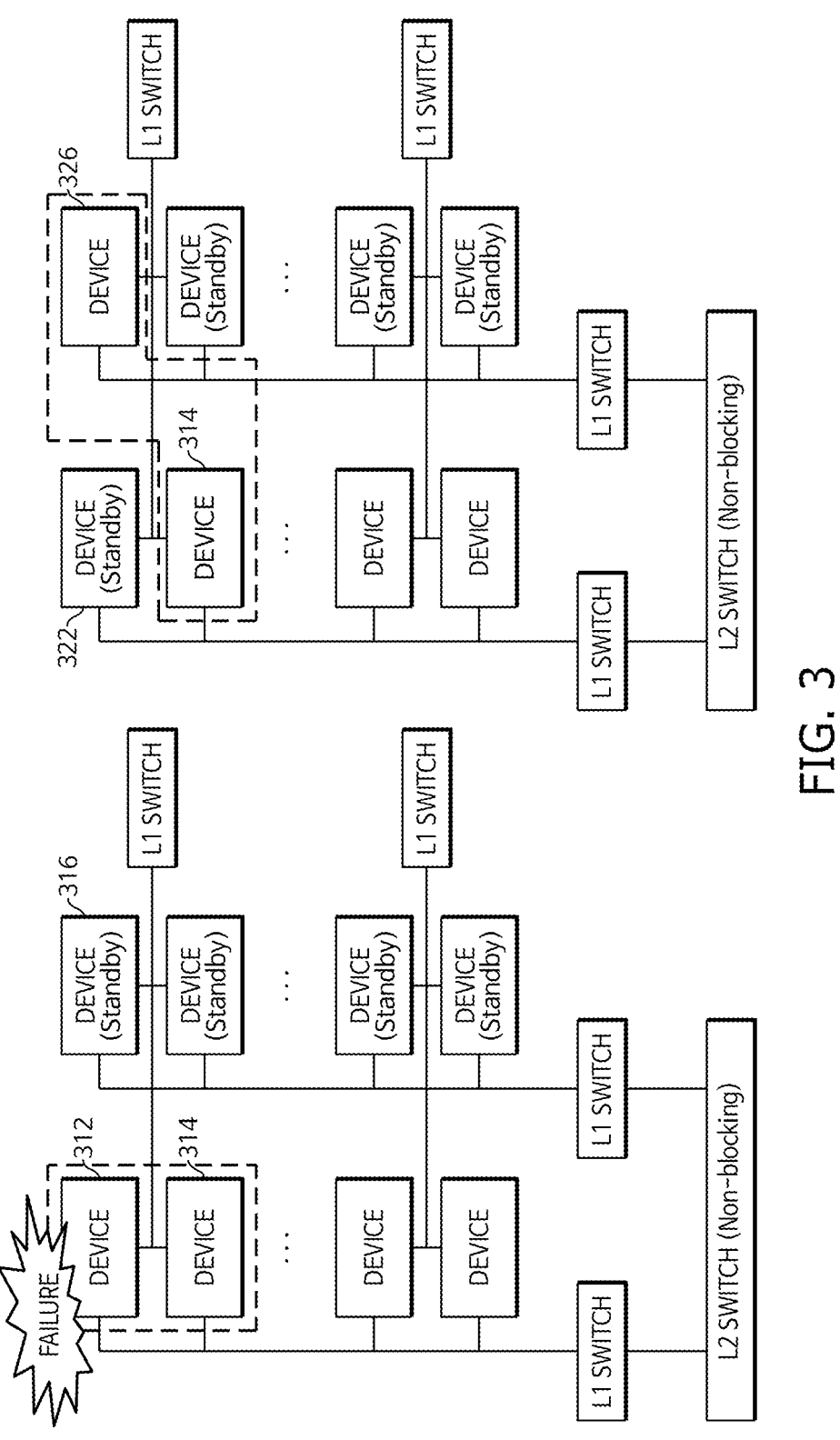
FIG. 3 is a diagram illustrating an example of performing fault tolerance using a device in an idle state.

FIG. 3 is a diagram illustrating an example of performing fault tolerance using a device 316 in an idle state. A first device 312 and a second device 314 belonging to a certain device group may be set to perform a series of tasks associated with the distributed environment applications. In this case, the first device 312 and the second device 314 may be in an active state.

If a failure occurs in the first device 312 in the active state, the third device 316 in the idle state belonging to the standby device group may be set to be switched to the active state and perform a task corresponding to the task associated with the first device 312. In this case, the third device 326 and the second device 314 switched to the active state may perform a series of tasks associated with the distributed environment applications that the first device 312 and the second device 314 performed before the failure occurred.

The certain device in which a failure occurred may be set to be registered in the standby device group as a device in an idle state, in response to being determined to be in a normal state after failure repair. For example, the first device 322 recovered from failure and switched to the idle state may be set to be registered in the standby device group. In this case, when a failure occurs in a certain device in the sub-network part group associated with the first device 322 switched to the idle state, the first device 322 may be set to perform a task corresponding to the task associated with the corresponding device.

Figure 4:
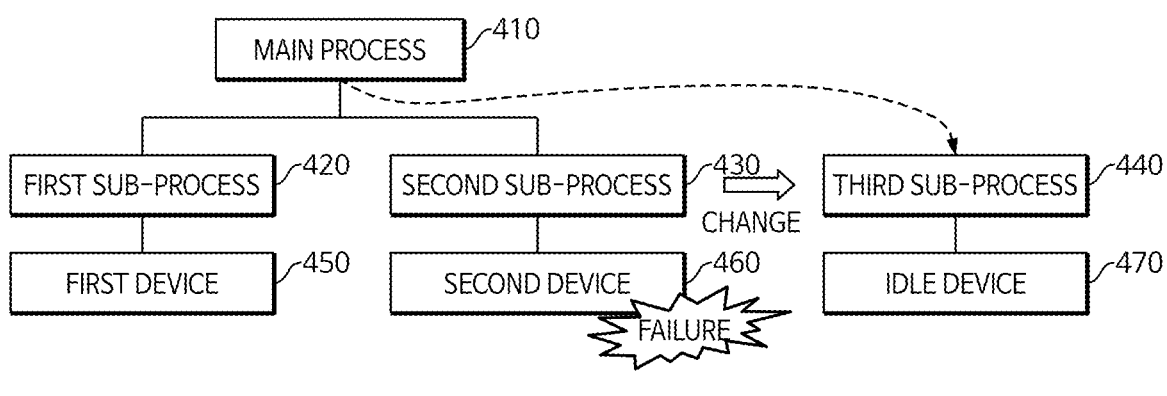
FIG. 4 is a diagram illustrating an example of performing fault tolerance using an idle device if a failure occurs in a device using a network system.

FIG. 4 is a diagram illustrating an example of performing fault tolerance using an idle device if a failure occurs in a device using a network system. A processor (one or more processors of an information processing system or user terminal) may execute a main process 410 and a plurality of sub-processes 420, 430, and 440 of the application. The main process 410 is an instance of a program executed on a computing apparatus, that is, an instance of an application, and may include a set of codes allocated to a memory, data, and execution states. For example, the main process 410 may process tasks for the application to perform, communicate and interact with other processes or the operating system, and process errors and/or exceptions that may occur during the execution of the application.

In addition, the plurality of sub-processes 420, 430, and 440 may be the processes that actually perform operations using a plurality of devices 450, 460, and 470 in relation to the execution of the application.

Each of the plurality of sub-processes 420, 430, and 440 may be a process for each of the plurality of devices 450, 460, and 470 associated with the application. The plurality of devices 450, 460, and 470 may be devices communicatively connected by the network system described in FIGS. 1 to 3. For example, the first device 450 may be a device belonging to the first device group (e.g., 212 in FIG. 2), the second device 460 may be a device belonging to the second device group (e.g., 214 in FIG. 2), and the third device 470 may be a device belonging to a third device group (e.g., 216 in FIG. 2). In this case, the first to third devices 450, 460, and 470 may be devices belonging to the same sub-network part. The examples of the plurality of devices 450, 460, and 470 illustrated in the example described above and FIG. 4 are for convenience of explanation, and the number of devices, the configuration of the device group, and the configuration of the sub-device group may be configured differently.

In addition, the plurality of devices 450, 460, and 470 may refer to accelerators. For example, the devices may refer to Graphics Processing Units (GPUs), etc., but are not limited thereto. Specifically, the processor may generate a sub-process and map a corresponding device. For example, the first sub-process 420 may be mapped to the first device 450, and the second sub-process 430 and the third sub-process 440 may be mapped to the second device 460 and the third device 470, respectively.

The main process 410 running on the processor may use an idle device to perform fault tolerance associated with the execution of the application. For example, if a failure occurs in any one of the plurality of devices 450, 460, and 470 that actually perform operations, the processor may execute a sub-process associated with the idle device to continue performing tasks without affecting the operation of the application.

For example, if a failure occurs in the second device 460, the processor may terminate the second sub-process 430. For example, the processor may receive failure occurrence information from the second sub-process 430 associated with the failing second device 460, and in response, may terminate the second sub-process 430. In another example, in response to a request to check the connection status, which is periodically sent to each sub-process, the processor may determine that a failure has occurred in the second device and terminate the second sub-process 430 if there is no response from the second sub-process in which the failure occurred for a predetermined period of time.

Then, or at the same time, the processor may switch the third device 470 from the idle state to the active state and execute the third sub-process 440. For example, the processor may execute the third sub-process 440 and associate it with the third device 470. The second device 460 and the third device 470 may be devices belonging to the same sub-network part.

The processor may apply the latest execution state associated with the second device 460 to the third device 470 to recover the failure of the second device 460. For example, for failure recovery, by applying a checkpoint including the latest execution state and an operation graph required for failure recovery associated with the second device to the idle device 470, the failure for the second device 460 may be recovered. The operation graph required for failure recovery may include an operation graph from a time point associated with the latest checkpoint to a time point at which the failure occurs.

Under this configuration, even if a sub-process is abnormally stopped due to a problem related to the device, work can continue from the latest execution state by executing a new sub-process through an idle device using a network system including the main network part and sub-network part, thereby maintaining continuity of application operation.

Figure 5:
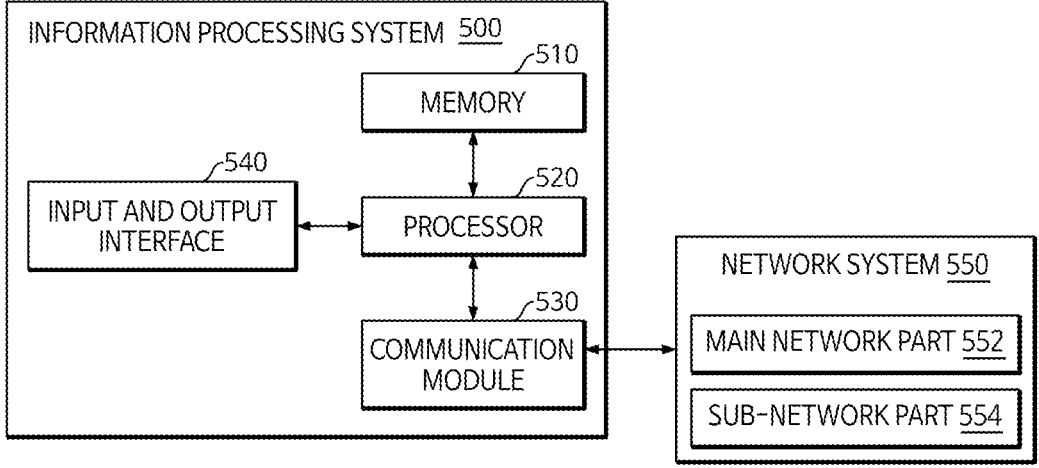
FIG. 5 is a block diagram illustrating an internal configuration of an information processing system.

FIG. 5 is a block diagram illustrating an internal configuration of an information processing system 500. The information processing system 500 may include a memory 510, a processor 520, a communication module 530, and an input and output interface 540. The information processing system 500 may be configured to communicate information and/or data through a network using the communication module 530. The information processing system 500 in FIG. 5 only illustrates a configuration that communicates with a network system 550 through the communication module 530, but aspects are not limited thereto, and the communication module 530 may be configured to be connected to a network for communicating with a user terminal and/or an external system.

The information processing system 500 may be configured to communicate information and/or data with the network system 550 through the communication module 530 to configure, register, and manage the network topology for running distributed environment applications.

The network system 550 may include the main network part 552 and the sub-network part 554. The main network part 552 is a network unit for interface between devices belonging to a plurality of device groups, and devices belonging to each device group may be configured to be connected to a leaf network switch and communicate with each other. In addition, one or more leaf network switches may be connected to a spine network switch such that all devices may communicate with each other through the leaf network switch and the spine network switch.

The sub-network part 554 is a network unit for interface between devices belonging to the sub-device groups, and the sub-network part 554 may include at least some of the devices belonging to each of different device groups. The devices belonging to each sub-device group may be configured to be connected to a network switch and communicate with each other.

Each device may refer to a server apparatus including memory, processor, accelerator, communication module, input/output interface, etc. In addition, one device may include a plurality of accelerators. In this case, the one device may be connected to a network switch through a single or a plurality of communication modules (e.g., Network Interface Cards (NICs)). In addition, a plurality of accelerators included in the device may be interconnected using high-speed interface technologies such as Infinity Fabric, NVLink, or PCI Express.

The memory 510 may include any computer readable medium. The memory 510 may include a non-transitory computer readable recording medium, and may include a permanent mass storage device such as read only memory (ROM), disk drive, solid state drive (SSD), flash memory, etc. In another example, a non-destructive mass storage device such as ROM, SSD, flash memory, disk drive, etc. may be included in the information processing system 500 as a separate permanent storage device that is distinct from the memory. In addition, the memory 510 may store an operating system and at least one program code (e.g., a code for setting, registration, management, etc. for a network topology, and a code for performing fault tolerance, etc. in response to a device failure).

These software components may be loaded from a computer-readable recording medium separate from the memory 510. Such a separate computer-readable recording medium may include a recording medium directly connectable to the information processing system 500, and may include a computer-readable recording medium such as a floppy drive, a disk, a tape, a DVD/CD-ROM drive, a memory card, etc., for example. In another example, the software components may be loaded into the memory 510 through the communication module 530 rather than the computer-readable recording medium. For example, at least one program may be loaded into the memory 510 based on a computer program (e.g., programs for configuring, registering, and managing network topology and performing fault tolerance for device failures, etc.) installed by files provided through the communication module 530 by a developer or a file distribution system that distributes application installation files.

The processor 520 may be configured to process the instructions of the computer program by performing basic arithmetic, logic, and input and output operations. The commands may be provided to a user terminal (not illustrated) or another external system by the memory 510 or the communication module 530. The processor 520 may receive an application execution command from the user terminal and, in response to the execution command, provide instructions for executing a plurality of sub-processes for a plurality of devices associated with the application to a plurality of devices included in the network system 550 through the communication module 530.

The communication module 530 may provide a configuration or function for the user terminal and the information processing system 500 to communicate with each other through a network, and provide a configuration or function for the information processing system 500 to communicate with an external device (e.g., a separate cloud system, a server system, a storage system, etc.). In addition, the processor 520 may be configured to communicate with each of a plurality of devices included in the network system 550. For example, control signals, instructions, data, etc. provided under the control of the processor 520 of the information processing system 500 may be transmitted to the user terminal and/or the external system through the communication module 530 and the network through the communication module of the user terminal and/or an external system. The processor 520 may provide information on a device failure associated with the execution of the application to a user terminal (not illustrated) executing the application.

In addition, the input and output interface 540 of the information processing system 500 may be a means for interfacing with a device (not illustrated) for inputting or outputting that may be connected to, or included in the information processing system 500. In FIG. 5, the input and output interface 540 is illustrated as a component configured separately from the processor 520, but aspects are not limited thereto, and the input and output interface 540 may be configured to be included in the processor 520. The information processing system 500 may include more components than those illustrated in FIG. 5. Meanwhile, most of the related components may not necessarily require exact illustration.

Figure 6:
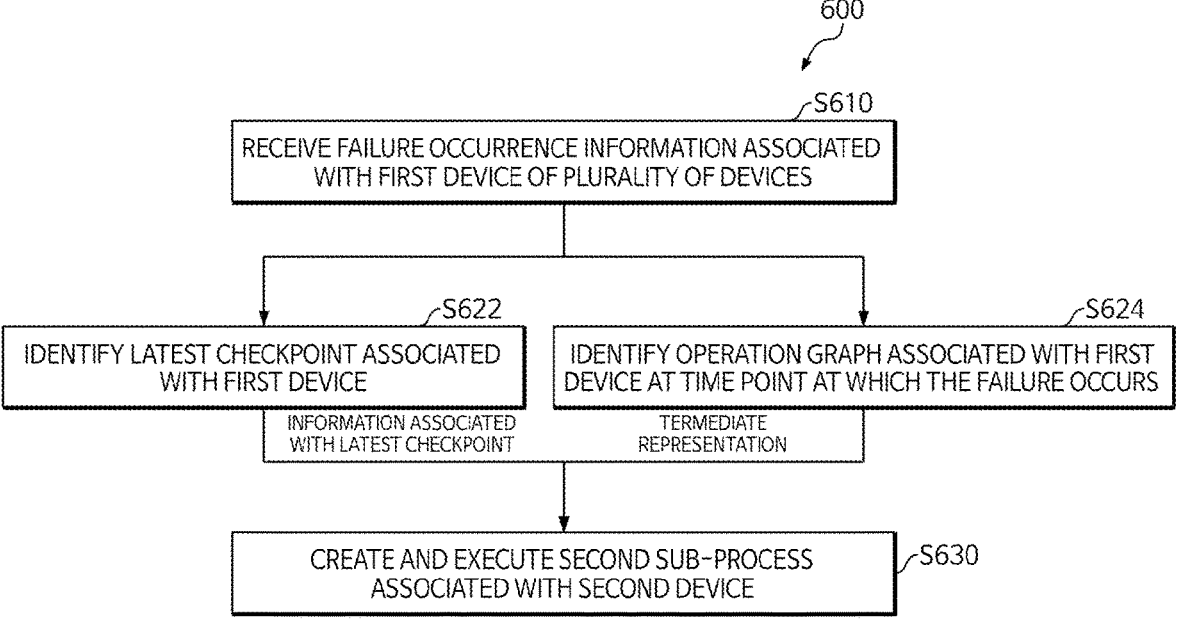
FIG. 6 is a flowchart illustrating an example of a specific method for performing fault tolerance using a network system.

FIG. 6 is a flowchart illustrating an example of a specific method 600 for performing fault tolerance using a network system. The method 600 may be initiated by a processor (e.g., one or more processors of the information processing system or user terminal) receiving failure occurrence information associated with a first device of a plurality of devices, at S610. The first device may represent a certain device belonging to a device group of a network system (e.g., FIG. 2).

The failure occurrence information associated with the device may be an error message. For example, the processor may receive failure occurrence information associated with the first device from a first sub-process associated with the first device. In another example, the failure occurrence information associated with the device may be a timeout. The processor may determine that a failure occurs in the first device, in response to not receiving a response from the first sub-process associated with the first device for a predetermined period of time to a connection status check request periodically transmitted to each of the sub-processes associated with the plurality of devices.

In response to receiving the failure occurrence information, the processor may terminate the first sub-process associated with the first device. Specifically, the processor may exclude the first sub-process associated with the first device from the tasks to be performed in association with the application. In addition, the processor may set such that the first device is not assigned as a workable device.

The processor may acquire the latest execution state information associated with the first device for failure recovery. The latest execution state information associated with the first device may include any data (e.g., input and output data, parameter data, operation data, etc.) for artificial intelligence operation associated with the first device in relation to application operation. For example, the processor may identify the latest checkpoint associated with the failing first device, at S622. Additionally, the processor may identify an operation graph required for failure recovery associated with the first device, at S624. The latest checkpoint associated with the first device may represent data and data values associated with the first device, which are periodically received from the first device through the network system and stored. In addition, the operation graph required for failure recovery associated with the first device may represent at least one operation graph associated with the operation performed on the first device, which is periodically received from the first device through the network system and stored. The operation graph required for failure recovery associated with the first device may include an operation graph from a time point associated with the latest checkpoint to a time point at which the failure occurs. The operation graph may refer to a graph generated for artificial intelligence operation and/or information associated therewith, which is generated to efficiently execute artificial intelligence operation. The operation graph is an intermediate expression generated after processing the operation of the input data, and may include the execution state information of the application.

The processor may create and execute a second sub-process associated with the newly allocated second device using the latest checkpoint and the operation graph required for failure recovery, at S630. The second sub-process may use the data stored in the checkpoint to restore the data to the memory of the newly allocated second device and execute an operation associated with the operation graph required for failure recovery. The newly allocated second device is a device belonging to the standby device group of the same sub-network part as the first device, and may represent a device switched to the active state to recover the failure of the first device.

Through this, even if a certain device executing operation fails while the application is running, the process associated with the device in an idle state is automatically created, and using this, the work performed in the process of the failing device is automatically switched and the failure can be restored without requiring separate user intervention, thereby improving the availability and reliability of the system.

Figure 7:
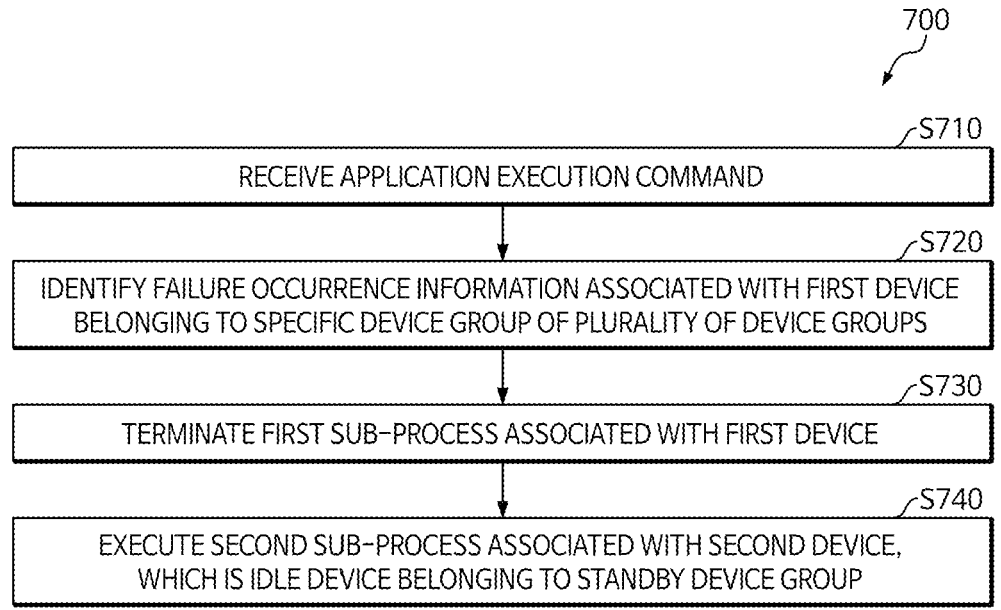
FIG. 7 is a flowchart illustrating an example of a method for performing fault tolerance using a network system.

FIG. 7 is a flowchart illustrating an example of a method 700 for performing fault tolerance using a network system. The method 700 may be initiated by a processor (e.g., one or more processors of the information processing system or user terminal) receiving an application execution command, at S710.

The processor may identify failure occurrence information associated with the first device belonging to a certain device group of the plurality of device groups, at S720. The processor may terminate the first sub-process associated with the first device, at S730.

The processor may execute a second sub-process associated with the second device, which is an idle device belonging to the standby device group, at S740. The first device and the second device may be devices belonging to the same sub-network. Specifically, the processor may identify the latest checkpoint associated with the first device. In addition, the processor may identify an operation graph required for recovery from the failure associated with the first device. The processor may execute a second sub-process associated with the second device using the latest checkpoint and the operation graph required for failure recovery.

For example, the processor may allocate the latest checkpoint and the operation graph required for failure recovery to the second sub-process, restore data associated with the first device using the latest checkpoint, and execute an operation associated with the operation graph required for failure recovery, thereby executing the second sub-process associated with the second device. The operation graph required for failure recovery may include an operation graph from a time point associated with the latest checkpoint to a time point at which the failure occurs.

The flowchart illustrated in FIG. 7 and the above description are merely examples, and may be implemented differently in some other examples. For example, one or more operations may be omitted or implemented by a different configuration, the order of operations may be changed, one or more operations may be performed simultaneously or in parallel, or one or more operations may be performed repeatedly multiple times.

The method described above may be provided as a computer program stored in a computer-readable recording medium for execution on a computer. The medium may be a type of medium that continuously stores a program executable by a computer, or temporarily stores the program for execution or download. In addition, the medium may be a variety of writing means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, and a ROM, a RAM, a flash memory, etc. In addition, other examples of the medium may include an app store that distributes applications, a site that supplies or distributes various software, and a recording medium or a storage medium managed by a server.

The methods, operations, or techniques of the present disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies according to design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the present disclosure, computer, or a combination thereof.

Accordingly, various example logic blocks, modules, and circuits described in connection with the present disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, etc. The instructions may be executable by one or more processors, and may cause the processor(s) to perform certain aspects of the functions described in the present disclosure.

Although the examples described above have been described as utilizing aspects of the currently disclosed subject matter in one or more standalone computer systems, aspects are not limited thereto, and may be implemented in conjunction with any computing environment, such as a network or distributed computing environment. Furthermore, the aspects of the subject matter in the present disclosure may be implemented in multiple processing chips or apparatus, and storage may be similarly influenced across a plurality of apparatus. Such apparatus may include PCs, network servers, and portable apparatus.

Although the present disclosure has been described in connection with some examples herein, various modifications and changes can be made without departing from the scope of the present disclosure, which can be understood by those skilled in the art to which the present disclosure pertains. In addition, such modifications and changes should be considered within the scope of the claims appended herein.

The invention claimed is:
1. A network system comprising:
a first interface device configured to interface devices of at least one first device group of a plurality of device groups with devices of at least one second device group of the plurality of device groups, wherein a device group of the plurality of device groups comprises a plurality of standby devices;

a plurality of second interface devices, wherein each interface device of the plurality of second interface devices corresponds to a different sub-device group of a plurality of sub-device groups and is configured to interface at least one first device of a respective sub-device group with at least one second device of the respective sub-device group, wherein each sub-device group of the plurality of sub-device groups comprises at least one device selected from each device group of the plurality of device groups; and a computing device configured to:

identify failure occurrence information associated with a failure of a first device belonging to a device group of the plurality of device groups;

terminate a first sub-process associated with the first device in a first sub-device group;

identify, based on a time indicated in the failure occurrence information, an operation graph required for failure recovery, the operation graph including operations to be executed from a time point associated with a latest checkpoint of the first device to a time point at which the failure occurs;

identify, based on the operation graph required for failure recovery, a second sub-process corresponding to operations affected by the failure associated with the first sub-process; and cause a second device to execute the second sub-process using the operation graph required for failure recovery, wherein the second device is in an idle state and belongs to a standby device group.

2. The network system according to claim 1, further comprising:

a plurality of third interface devices of a first type, wherein each interface device of the plurality of third interface devices is coupled to devices of a respective device group of the plurality of device groups.

3. The network system according to claim 1, wherein each interface device of the plurality of second interface devices comprises an interface device, of a first type, coupled to devices of the respective sub-device group.

4. The network system according to claim 1, wherein the second device belongs to a standby device group comprising standby devices in idle states.

5. The network system according to claim 1, wherein the computing device is configured to cause the second device to execute the second sub-process by switching the second device from an idle state to an active state.

6. The network system according to claim 1, wherein the computing device is further configured to:

based on a determination that the first device is in a normal state after resolving the failure, register the first device in a standby device group.

7. The network system according to claim 1, wherein the first device and the second device are devices belonging to a sub-device group corresponding to a same sub-network part.

8. The network system according to claim 1, wherein the computing device is configured to cause the second device to execute the second sub-process further based on a latest checkpoint associated with the first device.

9. The network system according to claim 1, wherein the computing device is configured to cause the second device to execute the second sub-process by: restoring data associated with the first device using a latest checkpoint.

10. A method performed by a network system, the method comprising:

identifying failure occurrence information associated with a failure of a first device belonging to a device group of a plurality of device groups;

terminating a first sub-process associated with the first device;

identifying, based on a time indicated in the failure occurrence information, an operation graph required for failure recovery, the operation graph including operations to be executed from a time point associated with a latest checkpoint of the first device to a time point at which the failure occurs;

identifying, based on the operation graph required for failure recovery, a second sub-process corresponding to operations affected by the failure associated with the first sub-process; and causing a second device to execute the second sub-process using the operation graph required for failure recovery, wherein the second device is in an idle state and belongs to a standby device group, and wherein the first device and the second device are devices belonging to a sub-device group corresponding to a same sub-network part.

11. The method according to claim 10, wherein the causing the second device to execute the second sub-process is further based on a latest checkpoint associated with the first device.

12. The method according to claim 10, wherein the causing the second device to execute the second sub-process comprises:

restoring data associated with the first device using a latest checkpoint.

13. The method according to claim 10, wherein the second sub-process corresponds to calculation of an error between training data and a prediction of labeled output as part of training of a deep learning model.

14. The method according to claim 10, wherein the failure occurrence information indicates a timeout.

15. One or more non-transitory computer-readable media storing instructions that, when executed by one or more processors of a computing device, cause the computing device to:

identify failure occurrence information associated with a failure of a first device belonging to a device group of a plurality of device groups;

terminate a first sub-process associated with the first device;

identify, based on a time indicated in the failure occurrence information, an operation graph required for failure recovery, the operation graph including operations to be executed from a time point associated with a latest checkpoint of the first device to a time point at which the failure occurs;

identify, based on the operation graph required for failure recovery, a second sub-process corresponding to operations affected by the failure associated with the first sub-process; and cause a second device to execute the second sub-process using the operation graph required for failure recovery, wherein the second device is in an idle state and belongs to a standby device group, wherein the first device and the second device are devices belonging to a sub-device group corresponding to a same sub-network part.

16. The one or more non-transitory computer-readable media of claim 15, wherein the instructions, when executed by the one or more processors, cause the computing device to cause the second device to execute the second sub-process further based on a latest checkpoint associated with the first device.

17. The one or more non-transitory computer-readable media of claim 15, wherein the instructions, when executed by the one or more processors, cause the computing device to cause the second device to execute the second sub-process by causing the computing device to:

restore data associated with the first device using a latest checkpoint.

18. The one or more non-transitory computer-readable media of claim 15, wherein the failure occurrence information indicates a timeout.

* * * * *